United States Patent [19]

Moore

[11] Patent Number: 4,552,936
[45] Date of Patent: Nov. 12, 1985

[54] WEATHERABLE ABRASION RESISTANT ETHERIFIED AMINOPLAST DERIVED COATING FOR PLASTIC SUBSTRATES

[75] Inventor: James E. Moore, Mt. Vernon, Ind.

[73] Assignee: General Electric Company, Pittsfield, Mass.

[21] Appl. No.: 641,914

[22] Filed: Aug. 17, 1984

[51] Int. Cl.$^4$ .................................................. C08L 67/04
[52] U.S. Cl. .................................. 525/519; 427/393.5; 428/412; 525/414; 525/415; 528/254
[58] Field of Search ............... 525/414, 415, 519, 509; 528/254

[56] References Cited

U.S. PATENT DOCUMENTS

| | | | |
|---|---|---|---|
| 3,806,480 | 4/1974 | Leonard | 260/24 |
| 3,994,851 | 11/1976 | Chang | 260/29.4 R |
| 4,096,125 | 6/1978 | Smith et al. | 260/75 |
| 4,101,603 | 7/1978 | Smith et al. | 525/415 |
| 4,197,392 | 4/1980 | Moore | 525/509 |
| 4,218,355 | 8/1980 | Chang et al. | 260/29.4 R |
| 4,425,466 | 1/1984 | Santer et al. | 524/512 |
| 4,440,913 | 4/1984 | Sugiura et al. | 525/443 |

FOREIGN PATENT DOCUMENTS 1308697 2/1973 United Kingdom .

Primary Examiner—Theodore E. Pertilla
Attorney, Agent, or Firm—John W. Harbour; William F. Mufatti

[57] ABSTRACT

A protective coating composition containing a polycaprolactone polyol and an aminoplast derivative is applied to a thermoplastic substrate to produce a thermoformable article having abrasion resistance, solvent resistance and weatherability.

4 Claims, No Drawings

WEATHERABLE ABRASION RESISTANT ETHERIFIED AMINOPLAST DERIVED COATING FOR PLASTIC SUBSTRATES

This invention relates to coatings for thermoplastic surfaces, to a method for the use of such coatings, and to the articles so coated. More particularly, this invention relates to protective coatings having good adhesion and thermoformability and their use to impart to plastic surfaces abrasion resistance, chemical solvent resistance, and weatherability. These protective coatings may be formulated from an aminoplast derivative and polycaprolactone polyols.

BACKGROUND

In the past years, plastics have become commercially vital materials used in a wide range of applications. Particularly, plastics may be applied as transparent articles, as translucent articles, or to opaque surfaces to provide texture, shine, and durability. Generally, these applications require a high degree of abrasion resistance in addition to other required properties, for example, impact strength, tensile strength, or elongation.

To date, no plastic exists which can be made to possess all desirable properties in the desirable proportions. Therefore, a coatings technology has developed which allows the joining of plastic materials and thereby a joining of their desirable properties. For example, the coatings technology may be used to join a substrate possessing high impact resistance, tensile strength, non-opacity, and elongation resistance, such as for example, a polycarbonate substrate, with an outer surface coating possessing high abrasion resistance, and low susceptibility to attack by solvents such as for example, an etherified aminoplast derived coating to produce a single article possessing the structural strength of the polycarbonates and the resistance to surface attack of the etherified aminoplast derivatives.

Coatings suitable for use on plastic substrates must also possess other secondary properties which render them useable. For example, a coating applied for abrasion resistance must also be compatible with the substrate, have good adhesion to the substrate and preferably, be weather resistant, thermoformable, and solvent resistant. It is often in secondary properties that a particular coating may be judged unsuitable for use in any particular application. Therefore, it is in the secondary properties that much effort for improvement is directed.

U.S. Pat. No. 4,197,392, assigned to the same assignee as the present invention, discloses a UV resistant transparent coating for plastic materials containing a melamine, a polyol, and a benzophenone. This coating has both weather resistance and thermoformability, however a greater degree of these two properties is desirable.

U.S. Pat. No. 4,096,125 discloses water-borne polycaprolactone coatings wherein polycaprolactone polyols are reacted with a polycarboxylic anhydride and subsequently with hexamethoxymethylmelamine. This coating has insufficient weather resistance and thermoformability.

U.S. Pat. No. 3,994,851 discloses a water-borne abrasion resistant coatings containing the reaction products of hexamethoxymethylmelamine and polycaprolactone polyols having a molecular weight less than about 850. Those coatings lack sufficient levels of adhesion and thermoformability.

It is therefore, an object of the present invention to provide protective coating compositions which may be applied to plastic substrates, particularly polycarbonate substrates to impart abrasion resistance, solvent resistance and weather resistance.

It is another object of the present invention to provide a protective coating for plastic substrates, particularly polycarbonate substrates, which will continue to adhere and weather well subsequent to a thermoforming process.

It is another object of the present invention to provide a method for protecting sensitive thermoplastic sheet from abrasion and solvent attack, even after prolonged weathering or thermoforming.

It is yet another object of the present invention to provide an abrasion resistant and solvent resistant coated thermoplastic article which will withstand thermoforming and prolonged weathering.

Various other objects and advantages of this invention will become apparent to those skilled in the art from the accompanying description and disclosure.

DESCRIPTION OF THE INVENTION

In the broad scope of the present invention there are provided protective coating compositions for thermoplastic substrates containing polycaprolactone polyols of controlled polycaprolactone chain length, an aminoplast derivative, a solvent, a catalyst and optionally a UV stabilizer and reaction stabilizer. This protective coating composition may be applied to any thermoplastic substrate, but preferably a polycarbonate substrate, to impart abrasion resistance, solvent resistance, and weatherability.

The parent polycaprolactone polyol which is reacted with the aminoplast derivative as described herein is provided by the reaction of an epsilon-caprolactone in the presence of a polyhydric initiator having at least two reactive hydrogen atoms present as hydroxyl. The epsilon-caprolactone monomers have the general formula,

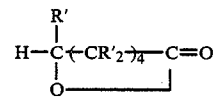

where R' is hydrogen or lower alkyl, that is, a linear or branched alkyl group having from 1 to 4 carbon atoms such as methyl, ethyl, propyl, isopropyl, butyl and t-butyl. Usually at least six of the R' groups are hydrogen and the remaining three are hydrogen, methyl or any combination thereof. The caprolactone polyol has a hydroxyl functionality corresponding to that of the polyhydric initiator and contains oxycaproyl units, that is units of,

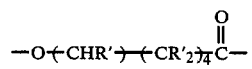

Preferably, the average number of such units is no less than about 3 for any single chain.

More specifically, the caprolactone polyol reactants are prepared by the reaction of the aforesaid epsilon-caprolactone monomers with a y-functional polyhydric initiator where y has a value of at least two and is usually no more than six, employing a monomer to initiator mole ratio of greater than about 6:1. The preparation of the parent caprolactone polyols is illustrated by the following equation which is specific to the preferred monomer, epsilon-caprolactone:

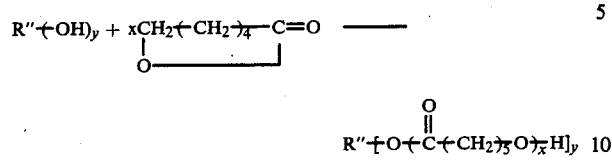

where R" denotes the residue of a polyhydric alcohol after subtracting y number of —OH groups, y preferably being 2 or 3 and x has an average value of from 3 to about 20 and preferably no less than 5. Though higher values of x are suitable, the high melting points and low solubility of such compounds may require the use of aggressive solvents for dissolution which would damage the plastic substrate to which the coating is applied.

Though polyhydric initiators with higher functionality are suitable, preferred polyhydric initiators encompassed by R"(OH)$_y$ are those wherein y is 2 such as for example glycol, dimethylolethane, dimethylolpropane, 1,4-butanediol, 1,6 hexanediol, diethylene glycol, di-1,2-propylene glycol, oxyethylated and/or oxypropylated adducts of such compounds such as, for example, ethylene oxide adducts of dimethylolpropane, and mixtures of any of the aforesaid initiators. It is evident, therefore, that R" is a saturated, aliphatic radical having at least two carbon atoms and consists of carbon and hydrogen, or carbon, hydrogen and oxygen where oxygen is present solely as ether oxygen, as in diethylene glycol or the aforementioned oxyalkylated adducts. The more commonly employed initiators have no more than 10 carbon atoms.

The class of caprolactone polyols suitable for use herein are the epsilon-caprolactone diols having an average molecular weight of from about 1000 to about 6000. Preferred are the diols having an average molecular weight of about 1250 or greater.

TONE Polyols are caprolactone based multifunctional polyols which are commercially available from Union Carbide Corporation. These polyols have a maximum acid number of 0.25 mg. KOH/g polyol and a maximum water content of 0.03%. Following are specific polyols and their properties:

TABLE 1

| | Aver. Mol. Wt. | Hydrox. No. mg. KOH/g | Melting Point Rng. °C. | Visc. Cent. 55°C. | Spec. Grav. 55/20 °C. |
|---|---|---|---|---|---|
| Difunctional | | | | | |
| TONE 0200 | 530 | 212 | 30–40 | 88 | 1.073 |
| TONE 0210 | 830 | 135 | 35–45 | 167 | 1.072 |
| TONE 0230 | 1250 | 90 | 40–50 | 284 | 1.071 |
| TONE 0240 | 2000 | 56.1 | 45–55 | 635 | 1.071 |
| TONE 0260 | 3000 | 37.4 | 50–60 | 1490 | 1.070 |
| Trifunctional | | | | | |
| TONE 0301 | 300 | 560 | 0 | 225 | 1.084 |
| TONE 0305 | 540 | 310 | 15–20 | 200 | 1.072 |
| TONE 0310 | 900 | 187 | 27–32 | 270 | 1.073 |

The parent caprolactone polyols which are reacted with aminoplast derivatives as described herein are prepared by methods known to the art such as those described in U.S. Pat. No. 3,169,945, the teachings of which are incorporated herein by reference. It is generally preferred that the reaction between the polyhydric initiator and monomer be effected at a temperature between about 130° C. in the presence of a catalyst such as stannous octoate or the other catalysts disclosed in said patent.

The aminoplasts for use herein are amine-aldehyde reaction products, i.e., aldehyde condensation products of amine compounds. Preferably, the aldehyde employed is formaldehyde, although the products can be made from other aldehydes, such as acetaldehyde, crotonaldehyde, acrolein, benzaldehyde, furfural and others. Suitable amines for use herein are for example, those of melamine, urea, triazines, diazines, triazoles, guanidines, guanamines, and alkyl and aryl substituted derivatives of such compounds including alkyl and aryl substituted melamine provided at least two amino groups are present.

These aminoplasts contain methylol or similar alkylol groups, the structure of the alkylol group depending upon the particular aldehyde employed. At least a portion, i.e., all or part, of these alkylol groups should be etherified by reaction with an alcohol. Any monohydric alcohol can be employed for this purpose, including aliphatic alcohols such as methanol, ethanol, propanol, butanol, and other alkanols, usually having up to about 6 carbon atoms; aromatic alcohols; such as benzyl alcohol cyclic alcohols such as cyclohexanol; monoethers of glycols such as the Cello-Solves and Carbitols; and halogen-substituted or other substituted alcohols such as 3-chloropropanol.

Though the above amines, aldehydes, and alcohols are suitable, the preferred aminoplast derived component of the coating composition of this invention is an amine-aldehyde-alcohol of the general formula:

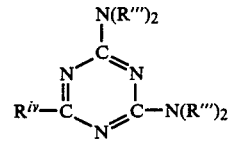

wherein R'" is independently selected from H, —CH$_2$OH, and —CH$_2$O(CH$_2$)$_z$H, wherein z is an integer from 1 to 6, and R$^{iv}$ is selected from H, —OH, —CH$_3$ and —N(R'")$_2$. Preferably, R$^{iv}$ is —N(R'")$_2$ and all R'" are an alkoxymethyl, particularly, methoxymethyl.

The aminoplast derived component is produced in a manner well known in the art using acidic or basic catalyst and varying conditions of time and temperature in accordance with conventional practice. The aldehyde is often employed as a solution in water or alcohol and the condensation, etherification, and polymerization reactions may be carried out either sequentially or simultaneously.

CYMEL 301 hexamethoxymethylmelamine is commercially available from American Cyanamid Company. This aminoplast derivative is a clear liquid with a specific gravity of 1.2, refractive index of 1.515–1.520, a free formaldehyde percent maximum of 0.30, a low free methylol content, an equivalent weight of 130–190, and a vapor pressure, 180° C., mm of 0.02–0.03.

The solvent used in the preparation of the coating composition includes alcohols, ketones, esters, ethers, alkoxy alkanols, halogenated compounds, carboxylic acids, aromatic compounds, or the like, which may be used alone or in a combination of two or more thereof. Particularly suitable examples of the solvent are lower alcohols (e.g. methanol, ethanol, propanol or butanol)

and alkoxy alkanols (e.g. methyl cellosolve, ethyl cellosolve or butyl cellosolve).

The solvent employed must not injure the substrate to which the coating composition is applied, that is, it must be nonagressive yet it must be capable of dissolving the aminoplast derivative and in particular the polycaprolactone polyol. Preferably, the solvent should be of such a volatility that it can be easily evaporated and removed from the coating composition at temperatures below cure temperature. A suitable, nonagressive solvent for a given substrate and a given polycaprolactone polyol may be readily determined by one skilled in the art. The preferred solvent is butyl cellosolve.

Suitable catalysts are alkyl acid phosphates, such as monomethyl acid phosphate, monoethyl acid phosphate, monopropyl acid phosphate and monobutyl acid phosphate, as well as the corresponding dialkyl compounds, such as dibutyl acid phosphate. A mixture of mono- and dialkyl phosphates is often utilized. In addition to the alkyl acid phosphates, examples of other acid catalysts which can be used include phosphoric acid, maleic acid and anhydride, fumaric acid, chloromaleic acid and anhydride, alkyl acid phthalates such as methyl, ethyl, propyl and butyl acid phthalates, monoalkyl succinates and maleates such as methyl, ethyl, propyl and butyl succinates and maleates and others having sufficient solubility to permit them to be dissolved in the coating composition at the desired proportion. Catalysts which have been found to be particularly suitable are compounds such as the sulfonic acids and derivatives thereof including, for example, p-toluene sulfonic acid, methyl-p-sulfonic acid and the like.

Protective coating compositions which are to be prepared in advance of or stored prior to application and cure require reaction stabilizers or stabilizers to deactivate the catalyst until cure. It is within the skill of the art to determine a suitable stabilizer for use with a given catalyst. The preferred catalyst of the instant invention, p-toluene sulfonic acid as well as others may be stabilized with equimolar amounts of a suitable amine stabilizer, for example, methylaminoethanol, triethylamine, 2 amino-2methyl-1 propanol but preferably the stabilizer is triethylamine.

Any suitable ultraviolet stabilizer may be used in the present invention at any concentration effective to protect the thermoplastic substrate from the degradative effects of light. Suitable ultraviolet absorbers are for example benzophenone derivatives, including:
2,2′4,4′-tetrahydroxybenzophenone;
2,2′-dihydroxy-4-methoxy-4′-ethoxybenzophenone;2-hydroxy-4,4′,5′-trimethoxybenzophenone;
2-hydroxy-4-propoxy-4′,6′-dichlorobenzophenone;
2-hydroxy-4-methoxy-4′-methylbenzophenone;
2-hydroxy-4-methoxy-2′-chlorobenzophenone;
2-hydroxy-4,4′,5′-trimethoxybenzophenone;
2-hydroxy-4-ethoxy-4′-methoxybenzophenone;
2-hydroxy-4-ethoxy-4′-propoxybenzophenone; and the like.

Suitable benzotriazole derivatives may also be employed including 2-(2′-hydroxy-5′-methylphenyl)-benzotriazole, 2-(2′-hydroxy-3′-methyl-5′-tert-butylphenyl)-benzotriazole, 2-(2′-hydroxy-3′-di-tert-butylphenyl)-benzotriazole and derivatives of crotonic acid such as a-cyano-b methyl-b-(p-methoxyphenyl)-crotonic acid methyl ester, a-cyano-b-N-(2-methyl-indolinyl)crotonic acid methyl ester, substituted acrylates such as 2 ethyl-hexyl-2-cyano-3,3-diphenyl acrylate as well as malonic acid esters such as, for example, the dimethyl, diethyl, dipropyl and the like esters of malonic acid and the like and mixtures thereof. Most preferred are the dihydroxybenzophenones such as: 2,4-dihydroxybenzophenone,2,2′-dihydroxybenzophenone, 2-hydroxy-5-aminobenzophenone, 2,2′,4,4′-tetrahydroxybenzophenone, 2,2′,5,5′-tetrahydroxybenzophenone, dihydroxyanthrophenones, dihydroxyanthrones, etc.

Although the protective coating herein is intended for application to any thermoplastic substrate, the preferred substrate is polycarbonate. The polycarbonate or polycarbonate blend can be prepared by an suitable process including those outlined in U.S. Pat. Nos. 3,028,365; 2,999,846; 3,248,414; 3,153,008; 3,215,668; 3,187,065; 2,964,974; 2,970,137; 2,991,273; 2,999,835; 3,014,891; 3,030,331; 3,431,224; 3,290,412 and the like.

The protective coating composition may be blended by mixing an aminoplast derived component, a polycaprolactone polyol, an appropriate, nonagressive solvent, a catalyst, and optionally, a reaction stabilizer and UV stabilizer. Preferably the weight ratio of aminoplast derived component to polycaprolactone polyol ranges from about 3/1 to about ½ and most preferably, from about 7/3 to about ⅔. The solvent should be added in sufficient amount to produce from about 15% to about 75% solids. The amount of catalyst, reaction stabilizer, and UV stabilizer which should be added is well within the determination of one skilled in the art.

The protective coating composition may be applied to the thermoplastic substrate by any of the well known means. Spraying, dipping, roll coating, and the like are appropriate coating techniques. The parameters of the coating technique chosen should be adjusted so as to produce a cured protective coating having a thickness of from about 0.05 to about 1 mil. Preferably the thickness should be about 0.2 mils.

The preferred method of curing the applied coating composition is by heat curing. The coated substrate may be heated in ovens by infrared radiation, by microwave, etc. Preferably the solvent used in the coating composition should be substantially evaporated before the reaction or cure temperature of the coating is reached.

The following examples further demonstrate specific embodiments of the instant invention. They are intended to be illustrative and are not to be construed as placing a limitation on the scope of the invention herein disclosed.

TESTS

Cross Hatch Adhesion Test (Adhesion Test)

The sample is tested in accordance with the procedure of ASTM D-3359 Method B. Samples which attain a rating of 5B in the ASTM standard are given a "Pass". Samples which show any flaking or detachment of the squares in the lattice are given a "Fail".

Taber Abrasion Test (Abrasion Test)

The sample is tested in accordance with the procedure of ASTM D-1044-78 using a CS-10F wheel, 500 g load, and 100 cycles. The reported figure is the percentage of transmitted light that is scattered by the abraded specimens.

Thermoform Test

The sample is heated to forming temperature and formed around a 1″radius mandrel. The sample is rated "Fail" if upon visual inspection any cracking, flaking, or detachment of the coating is observed.

Watersoak Test

The sample is tested in accordance with the above Cross Hatch Adhesion Test and immersed in a 65° C. water bath. The reported figure is the number of days which the sample is soaked before any flaking or detachment of the squares in the lattice is observed in subsequent adhesion tests.

EXAMPLE 1–4

The following polyols were combined with CYMEL 301, butyl cellosolve, and a catalyst mixture having 20% by weight p-toluenesulfonic acid and 80% by weight 2-propanol in the gram weight proportions shown below. The resulting coating composition was dip coated onto a ⅛" BPA polycarbonate panel and cured to a noncritical thickness of less than 1 mil at a temperature of 130° C. for 2 hours.

TABLE 2

|  | 1 | 2 | 3 | 4 |
| --- | --- | --- | --- | --- |
| CYMEL 301 | 192 | 192 | 192 | 192 |
| 1,4-butanediol | 48 | — | — | — |
| 1,6-hexanediol | — | 48 | — | — |
| Neopentylglycol | — | — | 48 | — |
| Trimethylolpropane | — | — | — | 48 |
| Butyl Cellosolve | 360 | 360 | 360 | 360 |
| Catalyst mixture | 12 | 12 | 12 | 12 |
| Adhesion Test | Fail | Fail | Fail | Fail |
| Abrasion Test | 4.8 | 3.5 | 6.4 | 4.7 |
| Thermoform Test | Fail | Fail | Fail | Fail |
| Watersoak Test | 1 | 1 | 1 | 1 |

EXAMPLES 5–12

The following TONE Polyols were combined with CYMEL 301, butyl cellosolve, and a catalyst mixture having 20% by weight p-toluenesulfonic acid and 80% by weight 2-propanol in the gram weight proportions show below. The resulting coating composition was dip coated on to an ⅛" BPA-polycarbonate panel and cured to a non critical thickness of less than 1 mil of a temperature of 130° C. for 2 hours.

TABLE 3

|  | 5 | 6 | 7 | 8 | 9 | 10 | 11 | 12 |
| --- | --- | --- | --- | --- | --- | --- | --- | --- |
| CYMEL 301 | 120 | 120 | 120 | 120 | 120 | 120 | 120 | 120 |
| TONE 200 | 120 | — | — | — | — | — | — | — |
| TONE 210 | — | 120 | — | — | — | — | — | — |
| TONE 230 | — | — | 120 | — | — | — | — | — |
| TONE 240 | — | — | — | 120 | — | — | — | — |
| TONE 260 | — | — | — | — | 120 | — | — | — |
| TONE 301 | — | — | — | — | — | 120 | — | — |
| TONE 305 | — | — | — | — | — | — | 120 | — |
| TONE 310 | — | — | — | — | — | — | — | 120 |
| Butyl Cellosolve | 360 | 360 | 360 | 360 | 360 | 360 | 360 | 360 |
| Catalyst Mixture | 12 | 12 | 12 | 12 | 12 | 12 | 12 | 12 |
| Adhesion Test | Pass | Pass | Pass | Pass | Pass | Pass | Pass | Pass |
| Abrasion Test | 5.5 | 6.2 | 7.4 | 7.6 | 6.3 | 3.6 | 1.7 | 4.2 |
| Thermoform Test | Pass | Pass | Pass | Pass | Pass | Fail | Pass | Pass |
| Watersoak Test | 3 | 3–5 | 5 | 14–21 | 19–22 | 1 | 3 | 1–4 |

EXAMPLES 13–17

TONE 0230 was combined with CYMEL 301, butyl cellosolve, a UV stabilizer, a reaction stabilizer mixture of 95% by weight 2-amino, 1-methyl, 1-propanol and 5% by weight water, and a catalyst mixture having 20% by weight p-toluene-sulfonic acid and 80% by weight 2-propanol in the gram weights shown below. The resulting coating composition was dip coated onto an ⅛" BPA-polycarbonate panel and cured to a noncritical thickness of less than 1 mil at a temperature of 130° C. for 2 hours.

TABLE 4

|  | 13 | 14 | 15 | 16 | 17 |
| --- | --- | --- | --- | --- | --- |
| CYMEL 301 | 168 | 144 | 120 | 96 | 72 |
| TONE 0230 | 72 | 96 | 120 | 144 | 168 |
| Butyl cellosolve | 360 | 360 | 360 | 360 | 360 |
| Dihydroxybenzophenone | 12 | 12 | 12 | 12 | 12 |
| Reaction Stabilizer Mixture | 6 | 6 | 6 | 6 | 6 |
| Catalyst Mixture | 10 | 10 | 10 | 10 | 10 |
| Adhesion Test | Pass | Pass | Pass | Pass | Pass |
| Abrasion Test | 8.2 | 9.6 | 14.6 | 25.2 | 28.8 |
| Thermoform Test | Pass | Pass | Pass | Pass | Pass |
| Watersoak Test | 21–27 | 14–21 | 14–21 | 7–14 | 27–35 |

EXAMPLES 18–22

TONE 0240 was combined with CYMEL 301, butyl cellosolve, a UV stabilizer, a reaction stabilizer mixture of 95% by weight 2-amino, 1-methyl, 1-propanol and 5% by weight water, and a catalyst mixture having 20% by weight p-toluene-sulfonic acid and 80% by weight 2-propanol in the gram weights shown below. The resulting coating composition was dip coated onto an ⅛" BPA-polycarbonate panel and cured to a noncritical thickness of less than 1 mil at a temperature of 130° C. for 2 hours.

TABLE 5

|  | 18 | 19 | 20 | 21 | 22 |
| --- | --- | --- | --- | --- | --- |
| CYMEL 301 | 168 | 144 | 120 | 96 | 72 |
| TONE 0240 | 72 | 96 | 120 | 144 | 168 |
| Butyl Cellosolve | 360 | 360 | 360 | 360 | 360 |
| Dihydroxybenzophenone | 12 | 12 | 12 | 12 | 12 |
| Reaction Stabilizer Mixture | 6 | 6 | 6 | 6 | 6 |
| Catalyst Mixture | 10 | 10 | 10 | 10 | 10 |
| Adhesion Test | Pass | Pass | Pass | Pass | Pass |
| Abrasion Test | 9 | 12.2 | 17.6 | 20.6 | 28 |
| Thermoform Test | Pass | Pass | Pass | Pass | Pass |

TABLE 5-continued

| | 18 | 19 | 20 | 21 | 22 |
|---|---|---|---|---|---|
| Watersoak Test | 50 | 14–21 | 50 | 50 | 28–35 |

EXAMPLES 23–27

TONE 0260 was combined with CYMEL 301, butyl cellosolve, a UV stabilizer, a reaction stabilizer mixture of 95% by weight 2-amino, 1-methyl, 1-propanol and 5% by weight water, and a catalyst mixture having 20% by weight p-toluene-sulfonic acid and 80% by weight 2-propanol in the gram weights shown below. The resulting coating composition was dip coated onto an ⅛" BPA-polycarbonate panel and cured to a noncritical thickness of less than 1 mil at a temperature of 130° C. for 2 hours.

TABLE 6

| | 23 | 24 | 25 | 26 | 27 |
|---|---|---|---|---|---|
| CYMEL 301 | 168 | 144 | 120 | 96 | 72 |
| TONE 0260 | 72 | 96 | 120 | 144 | 168 |
| Butyl Cellosolve | 360 | 360 | 360 | 360 | 360 |
| Dihydroxybenzophenone | 12 | 12 | 12 | 12 | 12 |
| Reaction Stabilizer Mixture | 6 | 6 | 6 | 6 | 6 |
| Catalyst Mixture | 10 | 10 | 10 | 10 | 10 |
| Adhesion Test | Pass | Pass | Pass | Pass | Pass |
| Abrasion Test | 6.0 | 8.5 | 10.5 | 15.3 | 25.1 |
| Thermoform Test | Fail | — | Pass | — | Pass |
| Watersoak Test | 23–30 | 50 | 50 | 50 | 28–35 |

What is claimed:

1. A curable protective coating composition for thermoplastic materials consisting essentially of
(i) an aminoplast derived compound;
(ii) polycaprolactone polyol of the general formula:

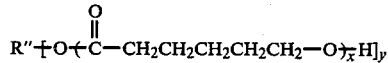

wherein $R''$ is a residue of a polyhydric alcohol; y is 2 or 3; x is on average greater than 3 but less than the value at which said polycaprolactone polyol is insoluble in a nonagressive solvent, and said polycaprolactone polyol has a molecular weight greater than 1000;
(iii) a solvent.

2. The coating composition of claim 1 which further contains a catalyst and reaction stabilizer.

3. A curable protective coating composition for thermoplastic materials consisting essentially of:
(i) an aminoplast derived compound of the general formula:

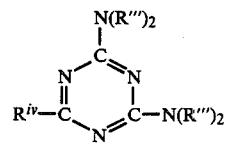

wherein $R'''$ is independently selected from the group consisting of H, —CH$_2$OH, and —CH$_2$O(CH$_2$)$_z$H, z is an integer from 1 to 6 and $R^{iv}$ is selected from the group consisting of H, —OH, —CH$_3$ and —N(R''')$_2$;
(ii) polycaprolactone polyol of the general formula:

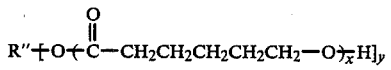

wherein $R''$ is a residue of a polyhydric alcohol; y is 2 or 3; x is on average greater than 3 but less than the value at which said polycaprolactone polyol is insoluble in a nonagressive solvent, and said polycaprolactone polyol has a molecular weight greater than 1000;
(iii) a solvent;
(iv) a reaction catalyst; and
(v) a reaction stabilizer.

4. The curable coating composition of claim 3 wherein x is on average greater than about 5 and said polycaprolactone polyol has a molecular weight greater than about 1250.

* * * * *